United States Patent [19]

Takabayashi

[11] Patent Number: 5,075,813
[45] Date of Patent: Dec. 24, 1991

[54] CELL PROTECTION APPARATUS AND METHOD FOR A BATTERY CELL SYSTEM

[75] Inventor: Yasuhiro Takabayashi, Kawasaki, Japan

[73] Assignee: Fuji Electric Co., Ltd., Kawasaki, Japan

[21] Appl. No.: 685,163

[22] Filed: Apr. 12, 1991

Related U.S. Application Data

[63] Continuation of Ser. No. 382,036, Jul. 18, 1989, abandoned.

[30] Foreign Application Priority Data

Jul. 25, 1988 [JP] Japan .................................. 63-184468

[51] Int. Cl.⁵ ................................................ H02H 3/18
[52] U.S. Cl. ......................................... 361/84; 320/40
[58] Field of Search ................ 361/84, 86, 91; 320/33, 320/40

[56] References Cited

U.S. PATENT DOCUMENTS

| 3,348,117 | 10/1967 | Houden | 361/84 |
| 4,090,227 | 5/1978 | Schweitzer | 361/84 |
| 4,559,486 | 12/1985 | Spencer et al. | 361/84 |
| 4,763,014 | 8/1988 | Model et al. | 361/84 |

Primary Examiner—Todd E. DeBoer
Attorney, Agent, or Firm—Spencer & Frank

[57] ABSTRACT

Reverse current to a battery cell is prevented without using a diode for preventing the reverse current. The reverse current protection is obtained by detecting the terminal voltage across the cell, and by opening a switching means connected to the cell when the terminal voltage of the cell increases more than a predetermined voltage value. The predetermined voltage value is determined in accordance with the I/V characteristics of the cell.

9 Claims, 7 Drawing Sheets

FIG. 8

CELL PROTECTION APPARATUS AND METHOD FOR A BATTERY CELL SYSTEM

This application is a continuation of application Ser. No. 07/382,036, filed July 18th, 1989 now abandoned.

1. Field of the Invention

The present invention relates to a cell protection apparatus and method for a battery cell system, and in particular to a cell protection apparatus for preventing a reverse current from flowing into a cell of a fuel cell generation system or a solar battery generation system.

2. Description of the Prior Art

In a fuel cell, it is well known that when electricity is generated through the chemical reaction between hydrogen gas and oxygen gas, water is produced at the same time. If a voltage higher than the voltage generated by the fuel cell is applied in a reverse direction to the fuel cell by means of a different power source such as regenerative power from a load, a reverse current will flow through the fuel cell. Such a reverse current causes electrolysis of the water produced in the fuel cell, thus generating oxygen at the hydrogen electrode and hydrogen at the oxygen electrode. If measures are not taken against this phenomenon, an explosion may occur due to the chemical reaction between the hydrogen and oxygen.

In order to prevent a reverse current from the load to the fuel cell, a diode for preventing the a reverse current or a reverse current detector is provided.

Figure 1:
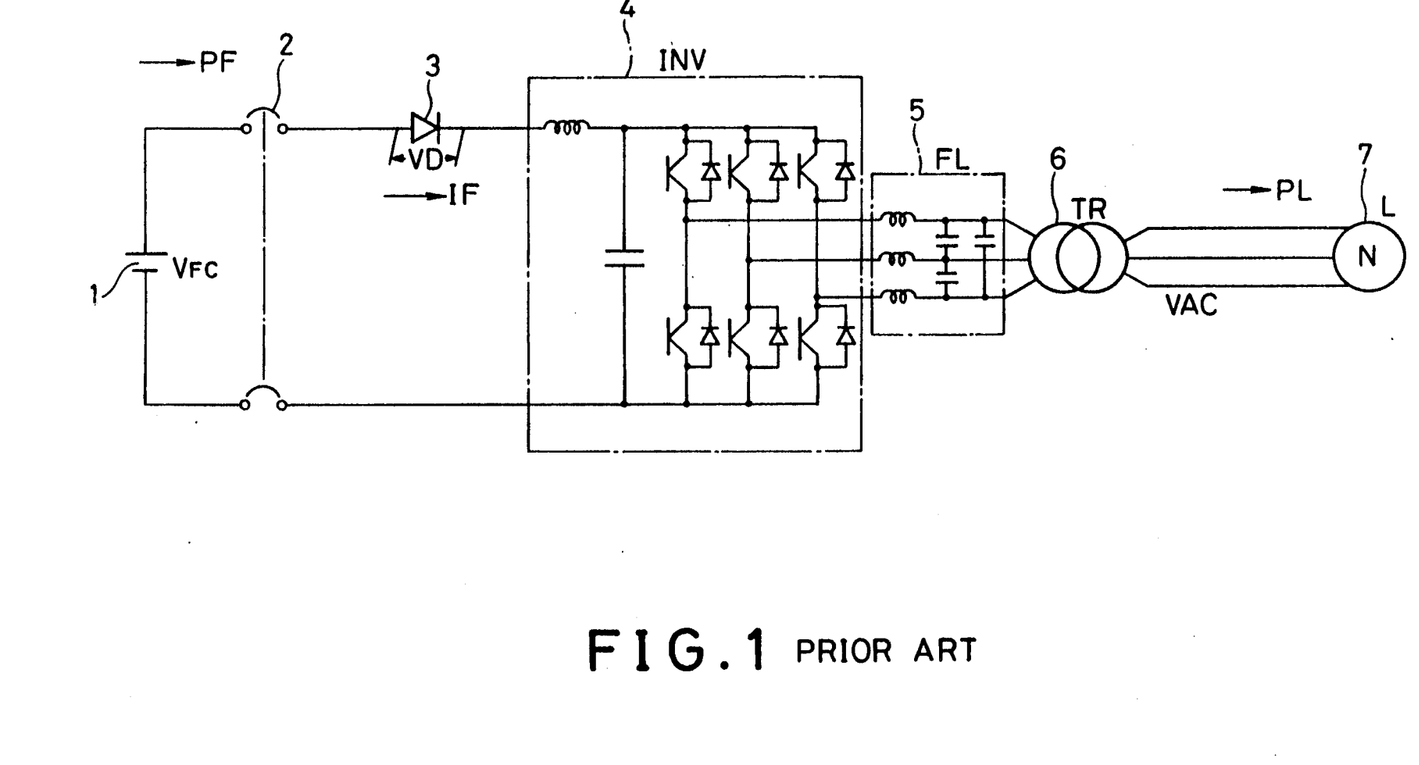
FIG. 1 is a circuit diagram showing an example of a prior art system with a diode for preventing a reverse current.
Figure 2:
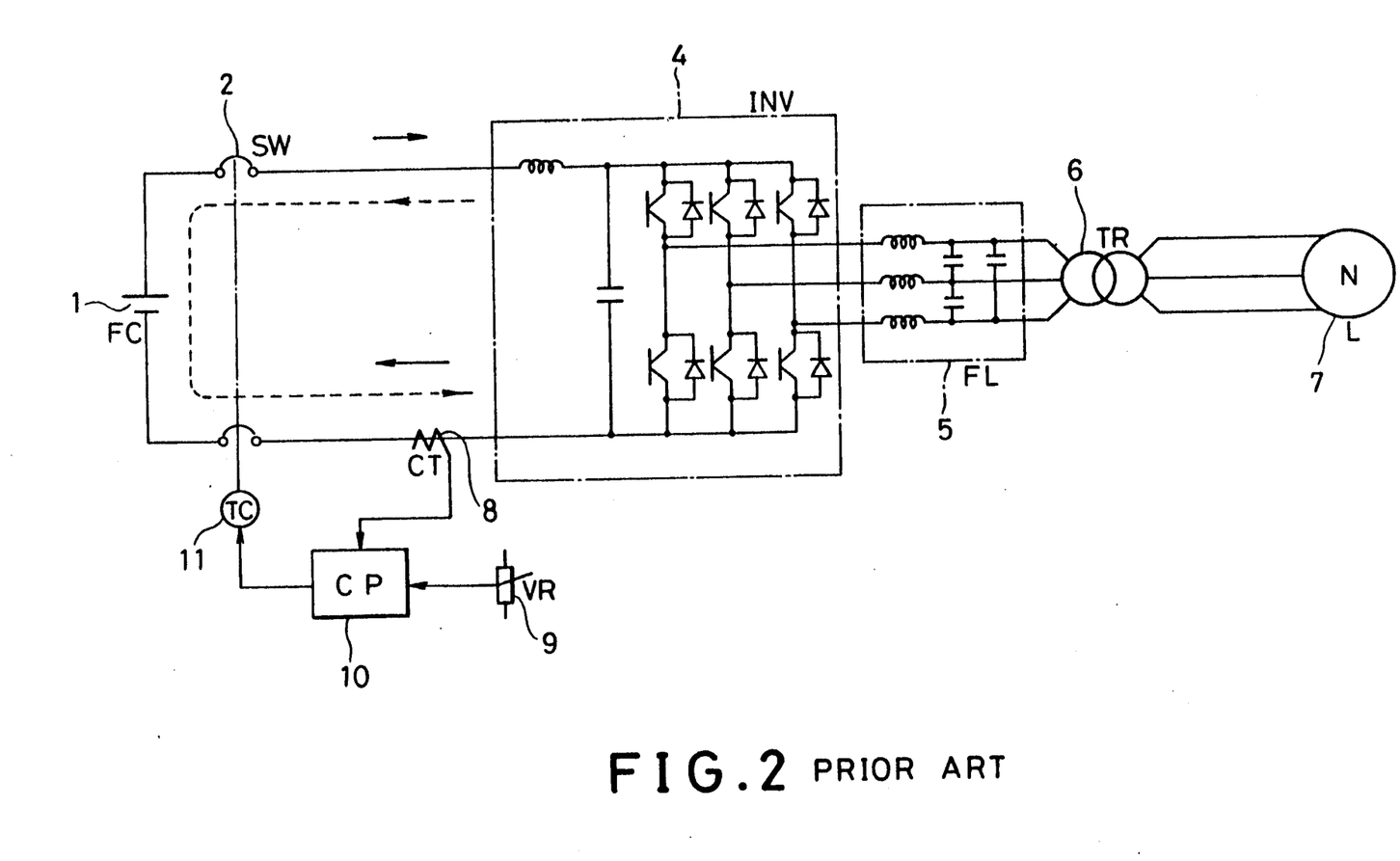
FIG. 2 is a circuit diagram showing an example of a prior art system using a reverse current detecting method.

Hitherto, as a reverse current preventing apparatus for the fuel cell generating system, apparatuses shown in FIGS. 1 and 2 are known. In the examples, DC electric power output from a fuel cell (FC) 1 is converted directly into AC power output by an inverter (INV) 4 and then the AC electric power $P_L$ is supplied to a load (L) 7 through a transformer (TR) 6.

The system shown in FIG. 1 includes a diode (D) 3 arranged in the output circuit of the fuel cell 1 to prevent regenerative power from the load 7 from flowing into the fuel cell 1. Reference numeral 2 denotes a switch (SW), and 5 denotes a filter (FL).

According to this method, the diode 3 produces loss ($P_{LOSS} = V_D \times I_F$) during its operation, so that the generation efficiency is degraded disadvantageously. For instance, if the output power from the fuel cell 1 is 1 MW, a power loss of 4 kW occurs. This loss corresponds to 0.4% of the output power.

In this generation system, the output power $P_I$ from the fuel cell 1 is larger than the load power $P_L$, and the equivalent voltage is $V_{FC} - (V_D + V_{INV} + V_{FL} + V_{TR}) \approx V_{AC}$, so that it is always required that the collection $V_{FC} > V_{AC}$ is satisfied, where $V_{FC}$ is the terminal voltage across the fuel cell 1, $V_D$ is the voltage across the diode 3, $V_{INV}$ is the voltage across the inverter 4, $V_{FL}$ is the voltage across the filter 5, $V_{TR}$ is the voltage across the transformer 6, and $V_{AC}$ is the voltage supplied to the load 7.

By the way, when a load is operated cooperatively with an electric power system or when a back electromotive force voltage is generated by a motor as the load, there is the possibility that the condition $V_{FC} < V_{AC}$ (the so-called regenerative condition or regeneration) will be established.

When a usual inverter is used the above-described value $V_D + V_{INV} + V_{FL} + V_{TR}$ is 30 to 40% under the assumption of $V_{FC} = 100\%$. This value does not relate to the DC/AC conversion efficiency directly. Hence, there is no regenerative power unless the voltage $V_{AC}$ indicates an abnormal value, that is, 30 to 40% of its rated voltage. Even if such a regenerative power occurs, the regenerative power is a rare phenomenon.

In the system shown in FIG. 2, the reverse current prevention is carried out by detecting a reverse current and by opening a switch in response to the detecting result.

In FIG. 2, the same reference numerals are provided to the corresponding elements shown in FIG. 1.

A current detector 8 in the form of a current transformer (CT) detects a reverse current from the load 7. The reverse current flows through a current judging means 10 in the form of a comparator (CP) when it exceeds a set current value predetermined by a current setting means 9 in the form of a variable resistor (VR). A trip coil (TC) 11 is energized in accordance with the result of the judgement to open the switch, thus interrupting the reverse current flowing into the fuel cell 1 from the load 7.

This method has a disadvantage in detection precision, since a very small reverse current less than about one percent of the rated current is to be detected.

Figure 3:
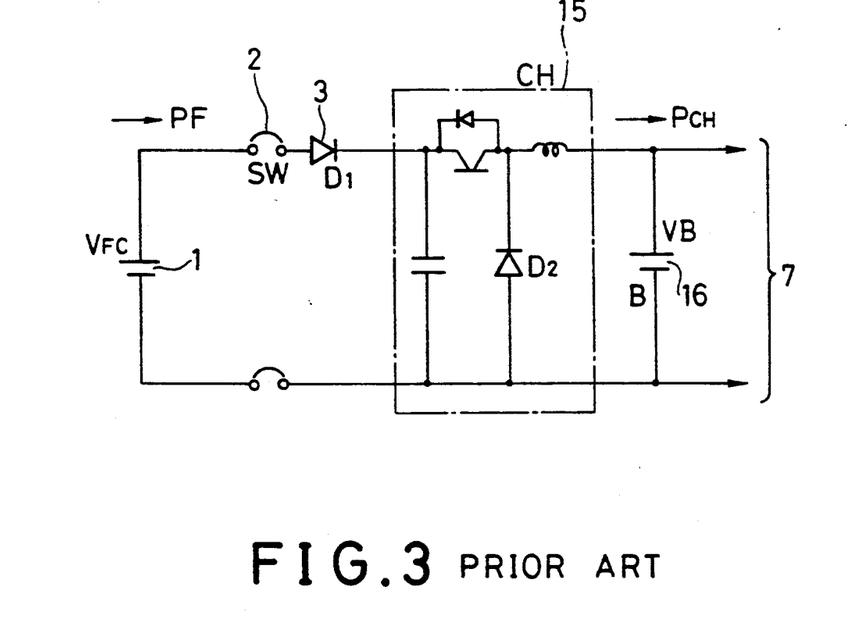
FIG. 3 is a circuit diagram showing an example of a prior art system with a DC/DC conversion voltage step-down chopper.
Figure 4:
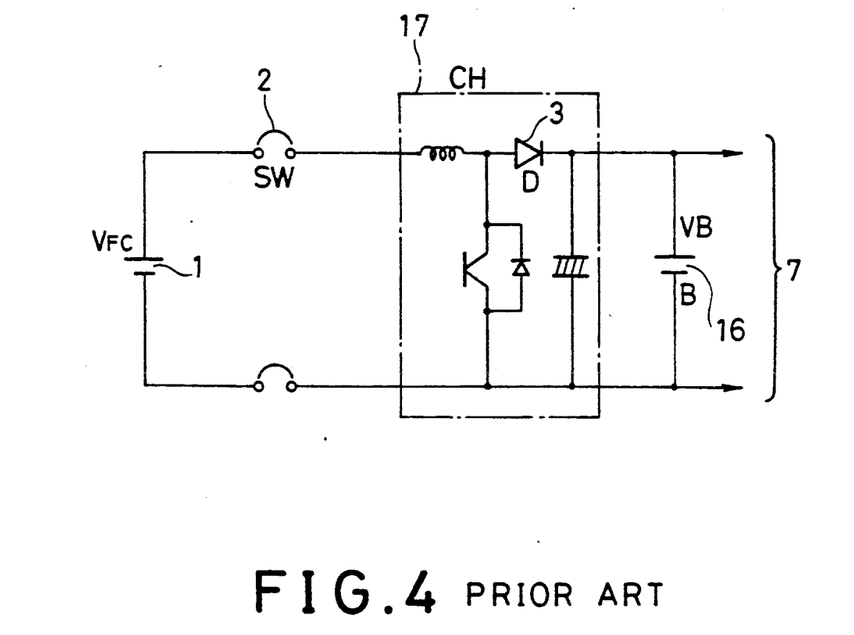
FIG. 4 is a circuit diagram showing an example of a prior art system with a DC/DC voltage conversion step-up chopper.

FIGS. 3 and 4 show prior art arrangements in the case of DC/DC conversion. These systems generally use so-called hybrid systems having a battery connected to a load.

FIG. 3 shows an example using a voltage step-down chopper. In FIG. 3, the same reference numerals as those in FIG. 1 are used to the corresponding portions. This is the system for providing a necessary electric power $P_F$ by controlling the condition $V_{FC} > V_B$ by the step-down chopper (CH) 15. Here, $V_B$ is a voltage supplied by a battery (B) 16. If $V_{FC} < V_B$, a reverse current flowing into the fuel cell 1 occurs. Hence, it is usual that the reverse current prevention diode (D1) 3 is used.

FIG. 4 shows a system with a voltage step-up chopper. In FIG. 4, the same reference numerals as those in FIG. 3 are given to the corresponding portions. In this system, the necessary electric power $P_F$ is supplied to a load by controlling the condition $V_{FC} < V_B$ by a voltage step-up chopper (CH) 17. In this case, if the diode (D) 3 within the voltage step-up chopper 17 is damaged, a reverse current flows into the fuel cell 1.

As described above, the conventional DC/DC conversion system can prevent reverse current by detecting the terminal voltage across the fuel cell.

However, in the above-mentioned units, the system having a diode for preventing the reverse current to the cell has a disadvantage in that the diode generates a power loss of a cell output while the system is operated. On the other hand, in the reverse current preventing system having the voltage step-up chopper, there is a disadvantage in that if the diode within the chopper is damaged, a reverse current flows into the cell.

Furthermore, in the reverse current preventing system having the current detector for detecting a reverse current and a switch for opening in accordance with the detected result, there is a disadvantage in that it is required that a reverse current be detected high accuracy.

SUMMARY OF THE INVENTION

In order to solve the above-mentioned problems, it is an object of the present invention to provide an improved regeneration preventing apparatus and method for a battery cell system which can prevent a reverse current from flowing into a battery cell. The flow of a reverse current is prevented without the use of a diode by employing a highly accurate voltage detection device.

In the first aspect of the present invention, a cell protection apparatus for preventing regenerative power from flowing into a battery cell in a battery cell system comprises:

a switching means connected to the battery cell for switching the battery cell;

a voltage judging means for judging whether the terminal voltage across the battery cell exceeds a predetermined voltage value to produce a judging signal; and means for opening the switching means in response to the judging signal.

Here, the voltage judging means may be a comparator.

The means for opening may be a trip coil.

The predetermined voltage value may be predetermined by a variable resistor.

The battery cell may be a fuel cell.

The battery cell may be a solar battery.

In the second aspect of the present invention, a regenerative power from flowing into a method of preventing battery cell in a battery cell system, comprises the steps of:

judging whether the terminal voltage across the battery cell exceeds a predetermined voltage value; and interrupting the flow of the regenerative power into the battery cell when the terminal voltage exceeds the predetermined voltage value.

The predetermined voltage value may be determined in accordance with the condition of a load to which electric power from the battery cell system is supplied.

The cell may be a fuel cell.

The cell may be a solar battery.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The present invention will be explained in detail hereinafter by referring to the drawings.

Figure 5:
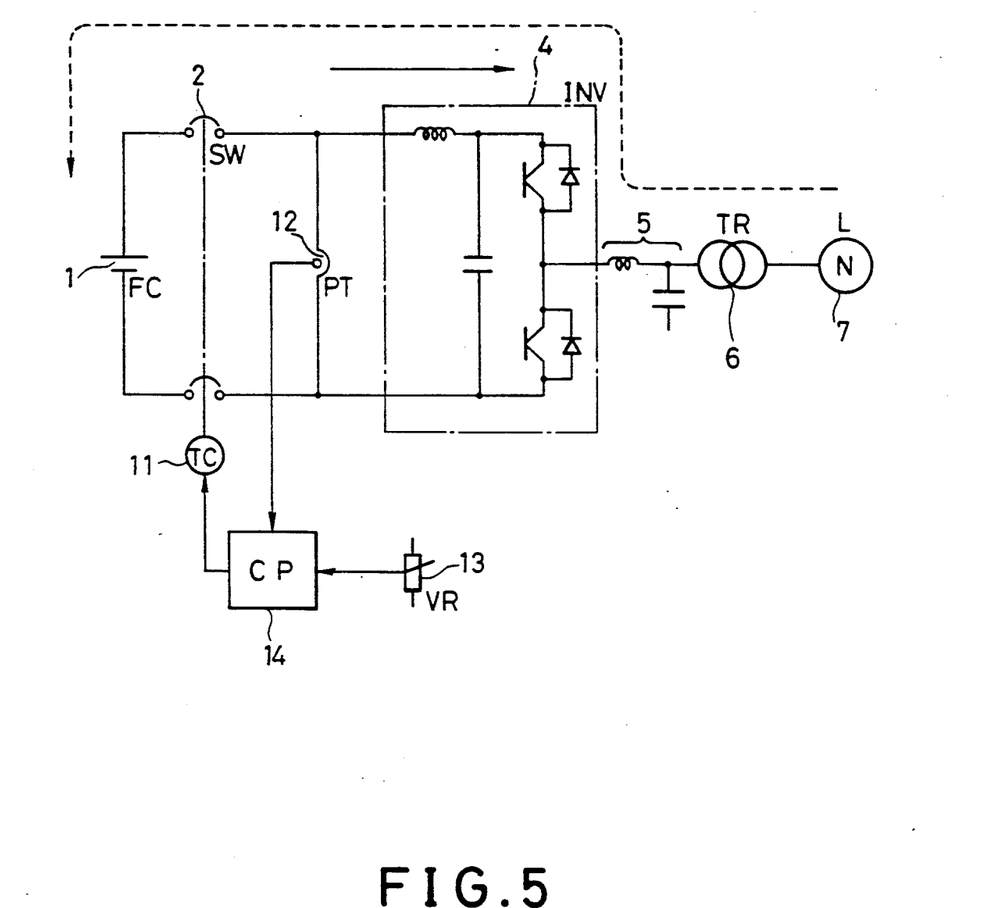
FIG. 5 is a circuit diagram showing an embodiment of the present invention.

FIG. 5 shows an embodiment of the present invention. In FIG. 5, the same reference numerals as those in FIG. 1 are used to designate the corresponding portions.

A voltage detector 12 in the form of a potentiometer (PT) detects the output voltage of the fuel cell 1. When the output voltage of the fuel cell 1 exceeds a set value which is set to be any one of the set voltages A, B, and C to be described hereinafter by a voltage setting means 13 in the form of a variable resistor (VR), the output voltage of the fuel cell 1 is judged by a voltage judging means 14 in the form of a comparator (CP). Then, the trip coil 11 of the switch (SW) 2 is energized in accordance with the judged result to open the switch (SW) 2, thus preventing a reverse current from flowing to the fuel cell 1 from the load 7.

Figure 6:
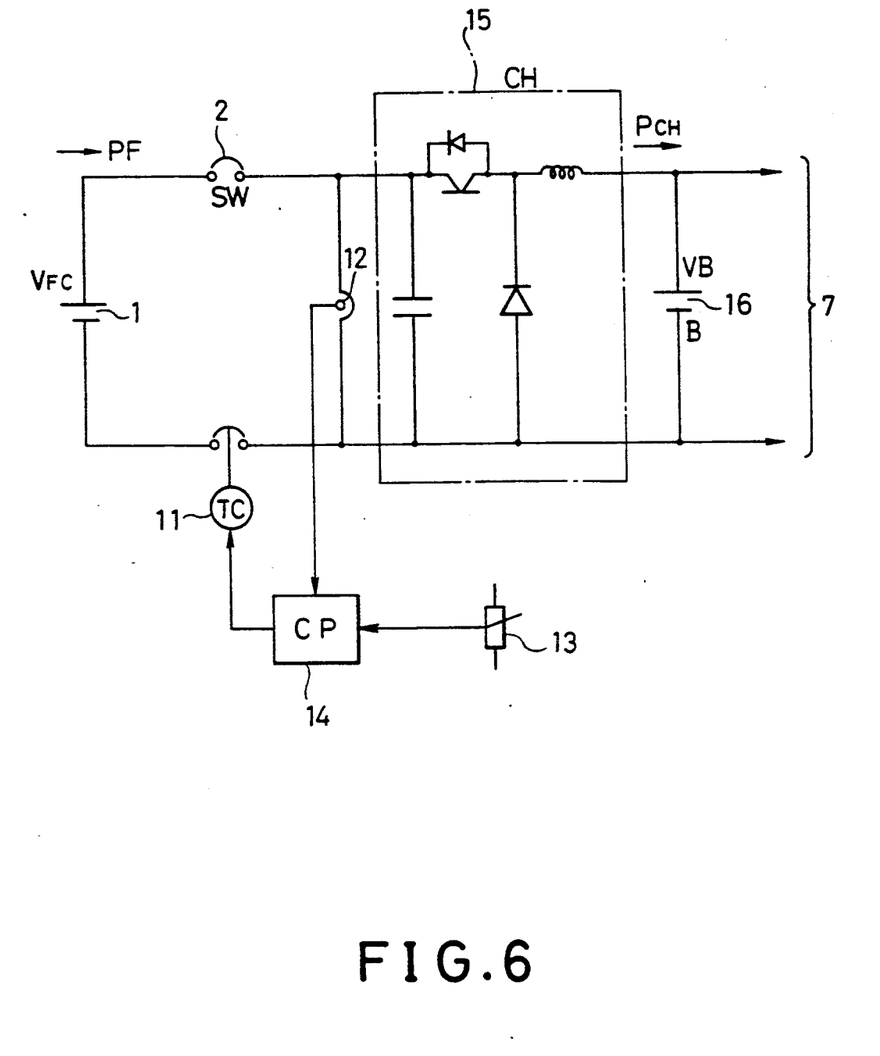
FIG. 6 is a circuit diagram showing another embodiment of the present invention.

FIG. 6 shows another embodiment of the present invention. In this embodiment, the voltage step-down chopper shown in FIG. 3 is used in the apparatus. The apparatus shown in FIG. 6 operates to prevent a reverse current from flowing into the fuel cell 1 in a manner similar to that of the embodiment shown in FIG. 5. Thus, its detailed explanation is eliminated.

Figure 8:
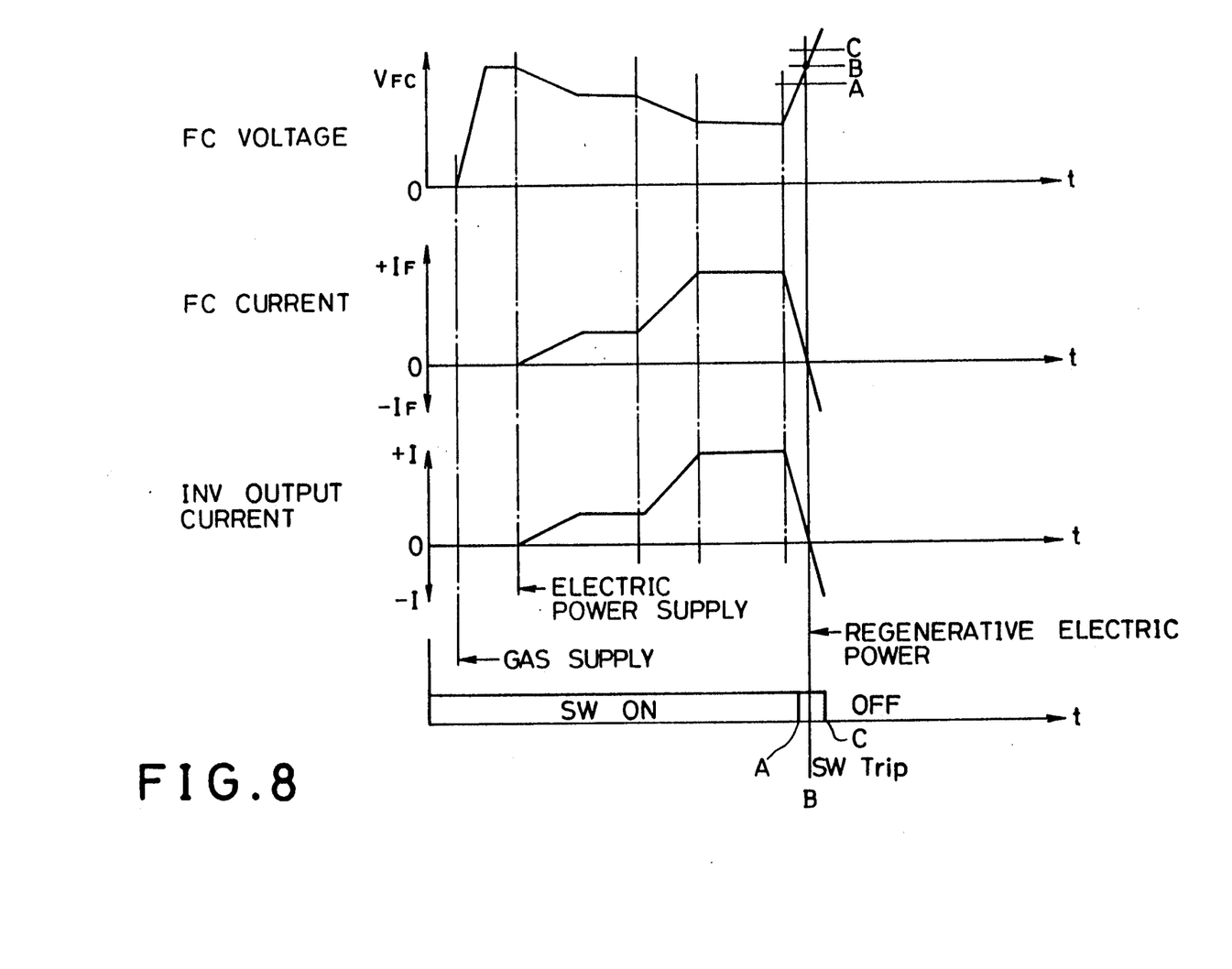
FIG. 8 is a general timing chart for a fuel cell generation system.

FIG. 8 is a timing chart showing the general operation of a fuel cell. Here, the set voltages A, B, and C are explained.

SET VALUE A . . . In a fuel cell generation unit, it is rare to operate it under a light load of 20% or less after starting a power supply. Hence, in such a system, the set voltage should be set at point A.

SET VALUE B . . . In a system which requires operation under a lighter load, the voltage should be set at point B in the vicinity of the non-load voltage of a fuel cell.

SET VALUE C . . . In a system in which a load varies to the vicinity of the non-load region, the voltage should be set to point C. In this case, a slight amount of a reverse current may flow, but does not in practice provide any trouble.

An open voltage (or non-load voltage) generated from the fuel cell is about 1.1 volts/cell. A voltage at a rating load point is 0.5-0.7 volt, and a load is 20 to 25% of a rating load in a minimum load operation (in this case, the fuel cell voltage is about 0.8 volt).

In the gas supply shown in FIG. 8, when temperature of the electrode of the fuel cell (FC) is at about 130° C., and if a hydrogen gas and an oxygen gas (generally contained in air) are supplied, the fuel cell generates electricity and the voltage across the cell increases.

Here, a converter such as the inverter 4, the chopper 15 or the like is disabled. Under these conditions, it is checked to determine whether or not the operating condition of the fuel cell is normal, by checking the cell voltage generated by the fuel cell (a so-called open voltage check).

If the generated voltage is much lower than about 1.1 volts which is the above-mentioned open voltage, there may be some abnormal situation in which, for example, not enough gas is supplied (abnormality in the gas supplying system) or gas leakage occurs near the electrode. After the generated voltage reaches a normal value, the inverter 4 or the chopper 15 is operated to supply electric power to the load 7.

As described above, the fuel cell is generally used at a generated voltage ranging from 0.5 to 0.8 volt, once power is supplied to the load from the cell. With this in view, it is preferable that point A (set value A) is set at a voltage between 0.8 and 1.1 volts, and that the voltage at point B (set value B) is set at about 1.1 volts. Since a slight amount of reverse current is allowable, it is preferable that the voltage at point C (set value C), is set at a voltage between 1.1 and volts 1.5. The reverse current due to the regenerative power from the load can be securely detected by monitoring the terminal voltage VFC across the fuel cell 1 under such a set voltage.

Figure 7:
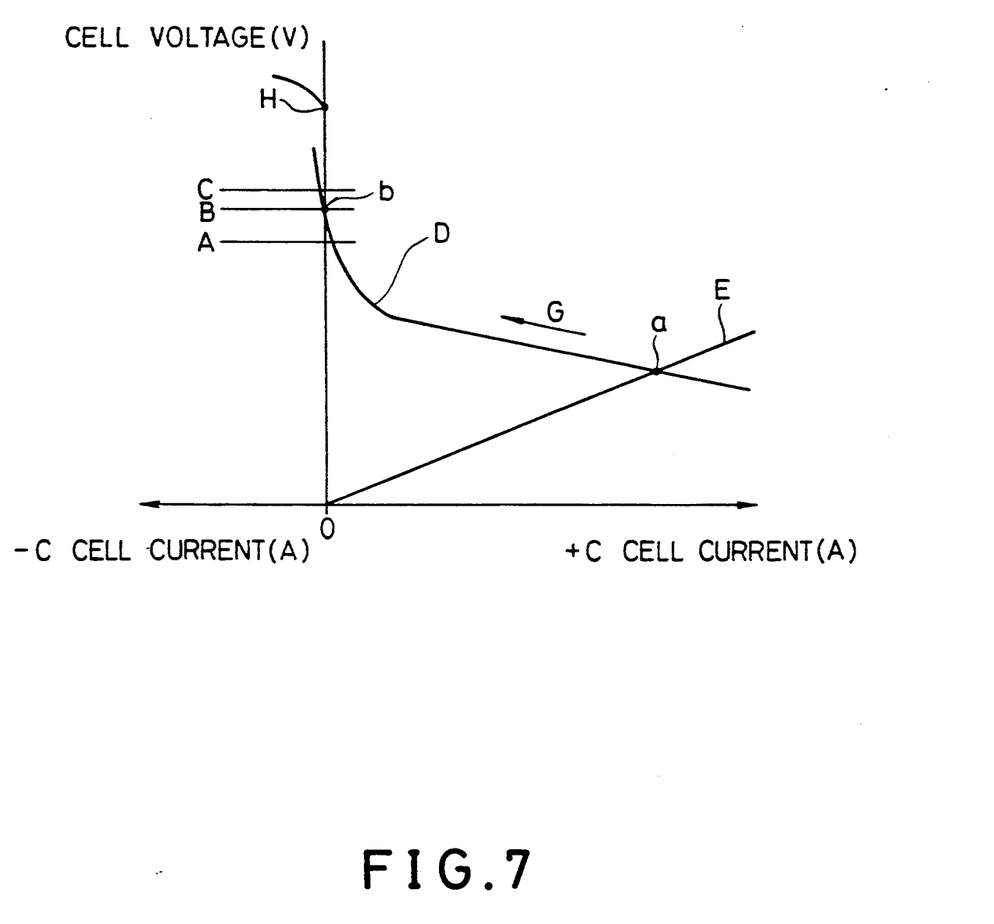
FIG. 7 is an explanatory diagram explaining the I/V characteristics of a fuel cell or a solar battery.

As described above, the present invention has been explained by referring to the embodiments in the case of regenerative power in a fuel cell generating system. The present invention, however, should not be limited to the above embodiments. The battery cell protection apparatus according to the present invention may also be effectively applied to a solar battery generation system having the same I/V characteristics as those of a fuel cell, as shown in FIG. 7.

According to the present invention, a diode for preventing a reverse current is not used. If regeneration occurs, the terminal voltage across the fuel cell or solar battery rises, since the cell current shifts from the operating point a (the intersection between I-V characteristic curve D for the cell and resistance line E) in the direction of arrow G (from +C (cell) current region to the −C current region), as shown in FIG. 7. The point H indicates a decomposition voltage (point b indicates a non-load voltage produced by opening the cell). Therefore, the reverse current can be prevented by detecting the terminal voltage of the cell, and by opening the switch when the terminal voltage of the cell increases to a value higher than a predetermined voltage A, B or C.

According to the present invention, when the terminal voltage across a battery cell exceeds a set voltage value, the switch is opened to prevent a reverse current from flowing into the cell. As a result, a diode for preventing the reverse current is not required. Accordingly, the power loss otherwise produced due to the diode is reduced and the generation system can be made compact. Also, since the voltage detecting method can be made simple and secure, the reliability of the power generation system can be improved.

The present invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A cell protection apparatus for preventing regenerative power from flowing into a battery cell in a battery cell system, said battery cell having a terminal voltage, comprising:
   switching means connected to a battery cell, said switching means connecting and disconnecting said battery cell with a load;
   voltage detecting means connected across said battery cell by said switching means, said voltage detecting means measuring the terminal voltage of said battery cell and providing a detection signal representative thereof;
   comparator means coupled to said voltage detecting means to receive said detection signal, said comparator means generating a comparator output signal when the terminal voltage measured by said detecting means exceeds a predetermined voltage value; and
   trip circuit means coupled to said comparator means and said switching means, said trip circuit means opening said switching means to disconnect said battery cell from said load in response to said comparator output signal.

2. A cell protection apparatus as claimed in claim 1, wherein said trip circuit means comprises a trip coil.

3. A cell protection apparatus as claimed in claim 1, wherein said predetermined voltage value is determined by a variable resistor coupled to said comparator means.

4. A cell protection apparatus as claimed in claim 1, wherein said battery cell is a fuel cell.

5. A cell protection apparatus as claimed in claim 1, wherein said battery cell is a solar battery.

6. A cell protection method for preventing regenerative power from flowing into a battery cell in a battery cell system, said battery cell having a terminal voltage, comprising the steps of:
   measuring the terminal voltage of a battery cell to detect whether the terminal voltage across said battery cell exceeds a predetermined voltage value; and
   interrupting the flow of regenerative power into said battery cell when the terminal voltage exceeds said predetermined voltage value.

7. A cell protection method as claimed in claim 6 which includes the further step of determining said predetermined voltage value in accordance with the condition of a load to which electric power from said battery cell system is supplied.

8. A cell protection method as claimed in claim 6, wherein said cell is a fuel cell.

9. A cell protection method as claimed in claim 6, wherein said cell is a solar battery.

* * * * *